UNITED STATES PATENT OFFICE.

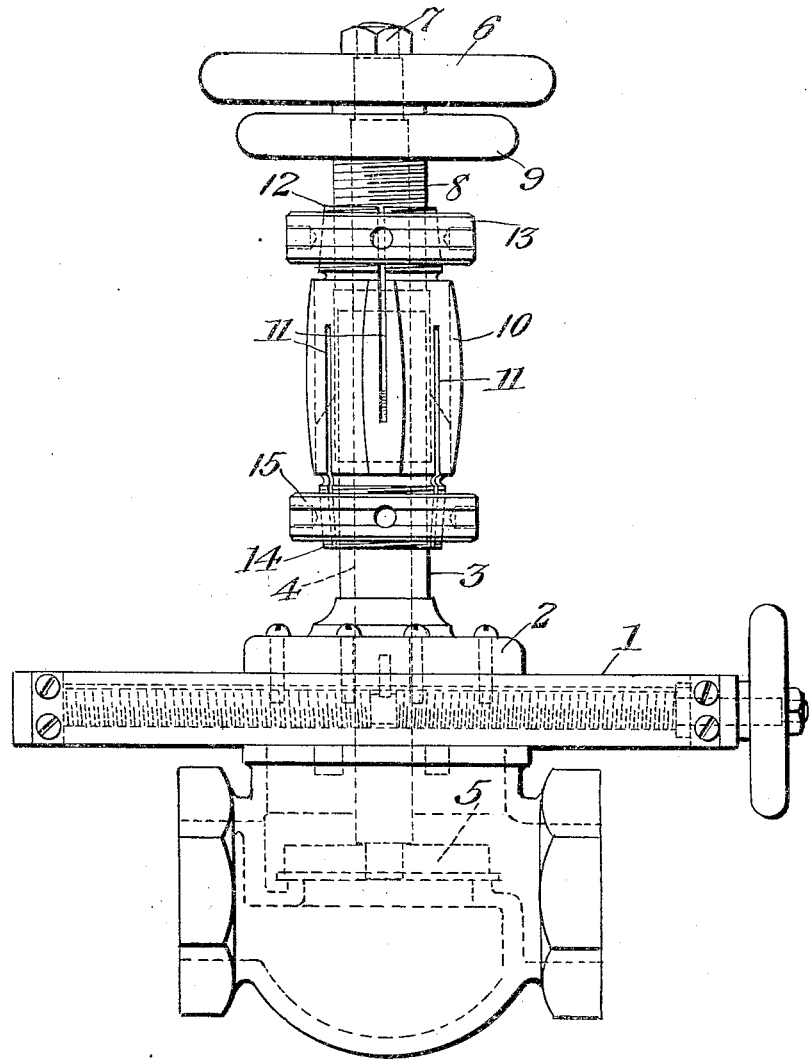

FRED A. DEXTER AND BAYARD P. DEXTER, OF ORANGE, MASSACHUSETTS.

FACING-TOOL FOR DRESSING VALVE-SEATS, &c.

1,337,052.                    Specification of Letters Patent.      Patented Apr. 13, 1920.

Application filed June 26, 1919. Serial No. 306,965.

*To all whom it may concern:*

Be it known that we, FRED A. DEXTER and BAYARD P. DEXTER, citizens of the United States, and residents of Orange, county of Franklin, State of Massachusetts, have invented certain new and useful Improvements in Facing-Tools for Dressing Valve-Seats, &c.; and we do hereby declare the following to be a full, clear, and exact description of the invention, such as will enable others skilled in the art to which it appertains, to make and use the same.

The invention relates to machines for dressing or facing valve seats and has for its object to equip a machine of the character described, adapted to be secured to a valve casing to permit the tool to be brought into engagement with the seat to be surfaced or dressed, with means to permit a quick adjustment of the facing tool toward the work and means for effecting a regulable feed of the tool after the same has engaged the work. To this end, the invention comprises a rotatable tool spindle mounted in a long bearing sleeve, with which tool spindle is associated a threaded feed sleeve and a resilient sleeve slidably mounted on the bearing sleeve, having threaded connection with the feed sleeve and adapted to be clamped to the bearing sleeve and the feed sleeve, so that when the clamping connection between the resilient sleeve and the bearing sleeve is released, the tool spindle may be moved bodily toward and from the work and when said clamp is set up, the spindle will be rigidly supported by the bearing sleeve and susceptible of longitudinal movement only upon operation of the feed sleeve, the screw threads of which engage with the interiorly threaded end of the resilient sleeve.

The accompanying drawing is a vertical elevation of a valve facing tool involving the invention.

The particular type of machine illustrated is that shown in our co-pending application, Serial No. 269,383, filed January 2, 1919, but it is to be understood that the invention is not limited to machines of this particular type, but is applicable to all forms of machines in which the tool spindle is adapted to be bodily moved toward and from the work for quick adjustment, and then positively connected to a feed device which feeds the tool toward the work by regulable slight adjustments.

Referring to the drawing, 1 indicates the clamping frame by means of which the apparatus is secured to either the inside or the outside of a valve casing, with the tool spindle disposed in a position normal to the plane of the valve seat to be faced or dressed, as more particularly set forth in the co-pending application aforesaid. Secured to the top of frame 1 is a base 2 from which rises a hollow standard or bearing sleeve 3 of sufficient length to constitute a relatively long bearing for the tool spindle 4, which latter carries at its lower end a facing or dressing tool 5, adapted to engage the valve seat. The upper end of the spindle 4 is provided with a hand wheel 6 secured thereto by nut 7.

Surrounding the upper end of the tool spindle is a feed sleeve 8 provided with exterior screw threads and equipped with a hand wheel 9 which lies below the hand wheel 6 on the tool spindle.

It has been customary heretofore in apparatus of this character to provide a threaded engagement between the upper end of the bearing sleeve 3 and the feed sleeve 8 to permit the normal feeding action of the tool to be effected by turning the hand wheel 9. Such an arrangement, however, did not admit of a quick adjustment of the tool toward the work. In order to effect this latter result, there is mounted on the exterior of the bearing sleeve 4 and slidably longitudinally thereof, a sleeve 10 provided with reëntrant slits 11 extending through the body of the sleeve 10 from respective ends thereof, so as to permit said ends to be expanded and contracted radially and therefore to constitute means for clamping or locking the sleeve to the elements which it engages. The ends 12 and 14 of the resilient sleeve 10 are reduced and tapered outwardly in an axial direction and provided with external screw threads, with which tapered screw threaded ends coöperate lock nuts or collars 13 and 15. The upper end 12 of the sleeve 10 surrounds the feed sleeve 8 and is provided with interior screw-threads which coöperate with the threads on said sleeve 8 in effecting the operating feed of the tool spindle.

When the lower nut or collar 15 is partly unscrewed from the tapered end 14 of the sleeve 10, the latter, together with the tool spindle 4 and the feed sleeve 8 may be moved bodily in an axial direction with respect to the bearing sleeve 3, so that the tool 5 may be quickly adjusted to engage the valve seat. The nut or collar is then turned up on the tapered end 14 of the sleeve 10, thereby locking the latter rigidly to the bearing sleeve 3 and the machine is ready for operation in re-surfacing or dressing the valve seat. The nut or collar 13 is set up on the tapered end 12 of the sleeve 10 to prevent self-feeding of the tool spindle and the operative feeding movement of the tool spindle is effected by turning the hand wheel 9, which advances the feed sleeve 8 in its threaded engagement with the interior of the end 12 of the sleeve 10, so that the feeding operation can be effected with certainty and accuracy.

What we claim is:—

1. A machine for facing valve seats and the like, comprising a rotatable tool spindle, a bearing sleeve for the same, a feed sleeve on the spindle above the bearing sleeve, a resilient sleeve slidably mounted on the bearing sleeve and having threaded connection with the feed sleeve, and means carried by the resilient sleeve for clamping it to the bearing sleeve.

2. A machine for facing valve seats and the like, comprising a rotatable tool spindle, a bearing sleeve for the same, a feed sleeve on the spindle above the bearing sleeve, a resilient sleeve slidably mounted on the bearing sleeve and having threaded connection with the feed sleeve, and separate means carried by the resilient sleeve for clamping it to the bearing sleeve and the feed sleeve.

3. A machine for facing valve seats and the like, comprising a rotatable tool spindle, a bearing sleeve for the same, a feed sleeve on the spindle above the bearing sleeve, a resilient sleeve slidably mounted on the bearing sleeve and having threaded connection with the feed sleeve, and nuts carried by the resilient sleeve for clamping it to the bearing sleeve and the feed sleeve.

4. A machine for facing valve seats and the like, comprising a rotatable tool spindle, a bearing sleeve for the same, a feed sleeve on the spindle above the bearing sleeve, a longitudinally slotted resilient sleeve mounted on the bearing sleeve and having threaded connection with the feed sleeve, and means carried by the resilient sleeve for clamping it to the bearing sleeve.

5. A machine for facing valve seats and the like, comprising a rotatable tool spindle, a bearing sleeve for the same, a longitudinally slotted resilient sleeve slidably mounted on the bearing sleeve having interior threaded connection with the feed sleeve and threaded tapering ends, and means engaging the tapering ends to clamp the resilient sleeve to the bearing sleeve and the feed sleeve.

6. A machine for facing valve seats and the like, comprising a rotatable tool spindle, a bearing sleeve for the same, a feed sleeve on the spindle above the bearing sleeve, a resilient sleeve having longitudinal slots extending from both ends into and through the body thereof, a threaded connection with the feed sleeve and threaded tapering ends, and nuts engaging the tapering ends to clamp the resilient sleeve to the bearing sleeve and the feed sleeve.

In testimony whereof we affix our signatures.

FRED A. DEXTER.
BAYARD P. DEXTER.